(12) United States Patent
Edge et al.

(10) Patent No.: US 11,879,426 B2
(45) Date of Patent: Jan. 23, 2024

(54) WIND TURBINE ROTOR BLADE ASSEMBLY HAVING A STRUCTURAL TRAILING EDGE

(71) Applicant: BLADE DYNAMICS LIMITED, Eastleigh (GB)

(72) Inventors: Andrew Stuart Edge, Eastleigh (GB); Paul Trevor Hayden, Eastleigh (GB); Harald Behmer, Eastleigh (GB); Mark Hancock, Eastleigh (GB); Harry Fish, Eastleigh (GB)

(73) Assignee: BLADE DYNAMICS LIMITED, Eastleigh (GB)

( * ) Notice: Subject to any disclaimer, the term of this patent is extended or adjusted under 35 U.S.C. 154(b) by 0 days.

(21) Appl. No.: 17/283,379

(22) PCT Filed: Oct. 29, 2019

(86) PCT No.: PCT/EP2019/079553
§ 371 (c)(1),
(2) Date: Apr. 7, 2021

(87) PCT Pub. No.: WO2020/089241
PCT Pub. Date: May 7, 2020

(65) Prior Publication Data
US 2021/0340948 A1    Nov. 4, 2021

(30) Foreign Application Priority Data

Oct. 29, 2018   (GB) ..................................... 1817628

(51) Int. Cl.
*F03D 1/06*      (2006.01)
*B29C 65/48*     (2006.01)
(Continued)

(52) U.S. Cl.
CPC ............ *F03D 1/0675* (2013.01); *B29C 65/48* (2013.01); *B29C 66/345* (2013.01); *B29C 66/54* (2013.01);
(Continued)

(58) Field of Classification Search
CPC ........... B29D 99/0025; B29L 2031/085; B29C 66/54; B29C 66/721; B29C 66/345;
(Continued)

(56) References Cited

U.S. PATENT DOCUMENTS 2,693,922 A * 11/1954 Ellison .................... E04C 2/292
                                                428/416
3,028,292 A * 4/1962 Hinds .................... B29C 70/742
                                                416/241 A
(Continued)

FOREIGN PATENT DOCUMENTS

| EP | 2402594 A1 | 1/2012 |
|----|------------|--------|
| EP | 3015703 A1 | 5/2016 |
| NL | 9100816 A  | 12/1992 |

OTHER PUBLICATIONS

Great Britain Priority Search Report dated Apr. 23, 2019 corresponding to application No. 1817628.9.

*Primary Examiner* — Jason L Vaughan
(74) *Attorney, Agent, or Firm* — Nath, Goldberg & Meyer; Jerald L. Meyer; Tanya E. Harkins

(57) ABSTRACT

A rotor blade assembly includes a rotor blade defining a pressure side and a suction side extending between a leading edge and a trailing edge. Further, the rotor blade assembly includes at least one structural feature secured within the rotor blade and spaced apart from the trailing edge to define a void between the pressure side, the suction side, and the trailing edge. Moreover, the rotor blade assembly includes an adhesive filling the void between the pressure side, the suction side, and the trailing edge to provide an adhesive (Continued)

connection between the pressure side, the suction side, the trailing edge, and the structural feature(s). In addition, the adhesive contacts the structural feature(s) at an interface and defines a fillet profile.

18 Claims, 4 Drawing Sheets

(51) Int. Cl.
    *B29C 65/00*     (2006.01)
    *B29D 99/00*     (2010.01)
    *B29L 31/08*     (2006.01)

(52) U.S. Cl.
    CPC .......... *B29C 66/545* (2013.01); *B29C 66/721* (2013.01); *B29D 99/0025* (2013.01); *B29L 2031/085* (2013.01); *F05B 2230/23* (2013.01); *F05B 2280/4007* (2013.01); *F05B 2280/6013* (2013.01)

(58) Field of Classification Search
    CPC ................... B29C 66/545; B29C 65/48; F05B 2280/4007; F05B 2280/6013; F05B 2230/23; F03D 1/0675
    See application file for complete search history.

(56) References Cited

U.S. PATENT DOCUMENTS

| | | | |
|---|---|---|---|
| 4,452,658 A * | 6/1984 | Schramm | B64C 27/46 |
| | | | 416/241 A |
| 4,671,471 A * | 6/1987 | Patmont | B64C 3/24 |
| | | | 416/241 A |
| 9,702,339 B2 * | 7/2017 | Liu | F03D 1/0675 |
| 9,739,260 B2 * | 8/2017 | Garm | F03D 1/0675 |
| 9,945,354 B2 * | 4/2018 | Shair | F03D 1/0675 |
| 10,107,258 B2 * | 10/2018 | Quiring | F03D 1/0675 |
| 10,648,451 B2 * | 5/2020 | Bendel | B29C 66/54 |
| 10,927,809 B2 * | 2/2021 | Barton | F03D 1/0675 |
| 2011/0211970 A1 | 9/2011 | Nies | |
| 2014/0003953 A1 | 1/2014 | Zeller et al. | |
| 2014/0294593 A1 | 10/2014 | Liu | |
| 2017/0058866 A1 | 3/2017 | Caruso et al. | |

\* cited by examiner

WIND TURBINE ROTOR BLADE ASSEMBLY HAVING A STRUCTURAL TRAILING EDGE

FIELD

The present disclosure relates in general to wind turbine rotor blades, and more particularly to a structural trailing edge for wind turbine rotor blades.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves.

In addition, conventional rotor blades require a substantial amount of bond paste to provide structure at various blade joints (e.g. at the leading or trailing edges of the rotor blade) to prevent local buckling of the suction and pressure side shells. Due to the complex geometry near these joint areas, it is often difficult to provide this structure in other ways that would be lighter than bond paste. Thus, conventional rotor blades typically utilize excess paste for the structure needed at the joints. Such excess paste, however, is expensive, heavy, and can limit the types of adhesives that can be used. For example, heavy and thick adhesive sections containing fast curing adhesives with high exothermic reactions can generate excess heat and damage the surrounding materials, thereby creating safety hazards.

In view of the foregoing, the art is continually seeking improved structural trailing edges for wind turbine rotor blades that address the aforementioned issues.

BRIEF DESCRIPTION

Aspects and advantages of the invention will be set forth in part in the following description, or may be obvious from the description, or may be learned through practice of the invention.

In one aspect, the present disclosure is directed to a rotor blade assembly. The rotor blade assembly includes a rotor blade defining a pressure side and a suction side extending between a leading edge and a trailing edge. Further, the rotor blade assembly includes at least one structural feature secured within the rotor blade and spaced apart from the trailing edge to define a void between the pressure side, the suction side, and the trailing edge. Moreover, the rotor blade assembly includes an adhesive filling the void between the pressure side, the suction side, and the trailing edge to provide an adhesive connection between the pressure side, the suction side, the trailing edge, and the structural feature(s). In addition, the adhesive contacts the structural feature(s) at an interface and defines a fillet profile.

In one embodiment, the fillet profile may define a convex curve that faces the trailing edge of the rotor blade. In another embodiment, the adhesive completely fills the void and the convex curve.

In further embodiments, the structural feature(s) may have a tapered chord-wise cross-section that contacts the inner surfaces of the pressure and suction sides. In such embodiments, the adhesive secures the structural feature(s) within the rotor blade and to the inner surfaces of the pressure and suction sides, respectively. In additional embodiments, the structural feature(s) is constructed, at least in part, of a thermoset material or a thermoplastic material. In such embodiments, the thermoset material and/or the thermoplastic material may also be reinforced with one or more fiber materials. In particular embodiments, the structural feature(s) may be constructed, at least in part, of a core material at least partially surrounded by at least one of the thermoset material or the thermoplastic material. In such embodiments, the core material may be compressible.

In additional embodiments, the structural feature(s) may include a hollow cross-section. In another embodiment, the rotor blade assembly may also include a pressurized air source configured to pressurize the structural feature(s) between the pressure and suction sides of the rotor blade. In one embodiment, the pressurized air source may be configured to provide pressurized air, for example, within the hollow cross-section. In several embodiments, the rotor blade assembly may further include a plurality of structural features arranged in an end-to-end configuration in a chord-wise direction.

In another aspect, the present disclosure is directed to a method for joining shell members of a rotor blade together. The method includes providing a first shell member of the rotor blade. The method further includes providing at least one structural feature atop the first shell member of the rotor blade and spaced apart from a trailing edge of the rotor blade. In addition, the method includes placing a second shell member of the rotor blade atop the first shell member to form the rotor blade. As such, the rotor blade defines a void between the first shell member, the second shell member, the trailing edge, and the structural feature(s). Moreover, the method includes applying pressure to either or both of the first or second shell members to compress the structural feature(s), thereby forming a fillet profile within the void. Further, the method includes filling the void with an adhesive to provide an adhesive connection between the first shell member, the second shell member, the trailing edge, and the structural feature(s).

In one embodiment, the fillet profile may define a convex curve that faces the trailing edge of the rotor blade. In such embodiments, the step of filling the void with the adhesive may further include filling the convex curve with the adhesive. In another embodiment, the step of providing the structural feature(s) atop the first shell member of the rotor blade and spaced apart from the trailing edge may include pre-forming the structural feature(s) and securing the structural feature(s) to the first shell member. Alternatively, the step of providing the structural feature(s) atop the first shell member of the rotor blade and spaced apart from the trailing edge may include printing and depositing, via a computer numeric control (CNC) device, the structural feature(s) onto the first or second shell members of the rotor blade.

In further embodiments, the step of applying pressure to either or both of the first or second shell members to compress the structural feature(s) causes a tapered chord-wise cross-section of the structural feature(s) to contact the inner surfaces of the first and/or second shell members of the rotor blade.

In additional embodiments, the method may further include providing the adhesive between the inner surfaces of the first and second shell members of the rotor blade and the structural feature(s) to secure the structural feature(s) within the rotor blade.

In particular embodiments, the method may include forming the structural feature(s), at least in part, of a thermoset material and/or a thermoplastic material. In such embodiments, the method may also include reinforcing the thermoset material and/or the thermoplastic material with one or more fiber materials. In certain embodiments, the step of forming the structural feature(s), at least in part, of the thermoset material and/or the thermoplastic material may include at least partially surrounding a core material with at least one of the thermoset material or the thermoplastic material.

In yet another embodiment, the step of providing the structural feature(s) atop the first shell member of the rotor blade and spaced apart from the trailing edge of the rotor blade may include arranging a plurality of structural features in an end-to-end configuration in a chord-wise direction. It should be understood that the method may further include any of the additional features and/or steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
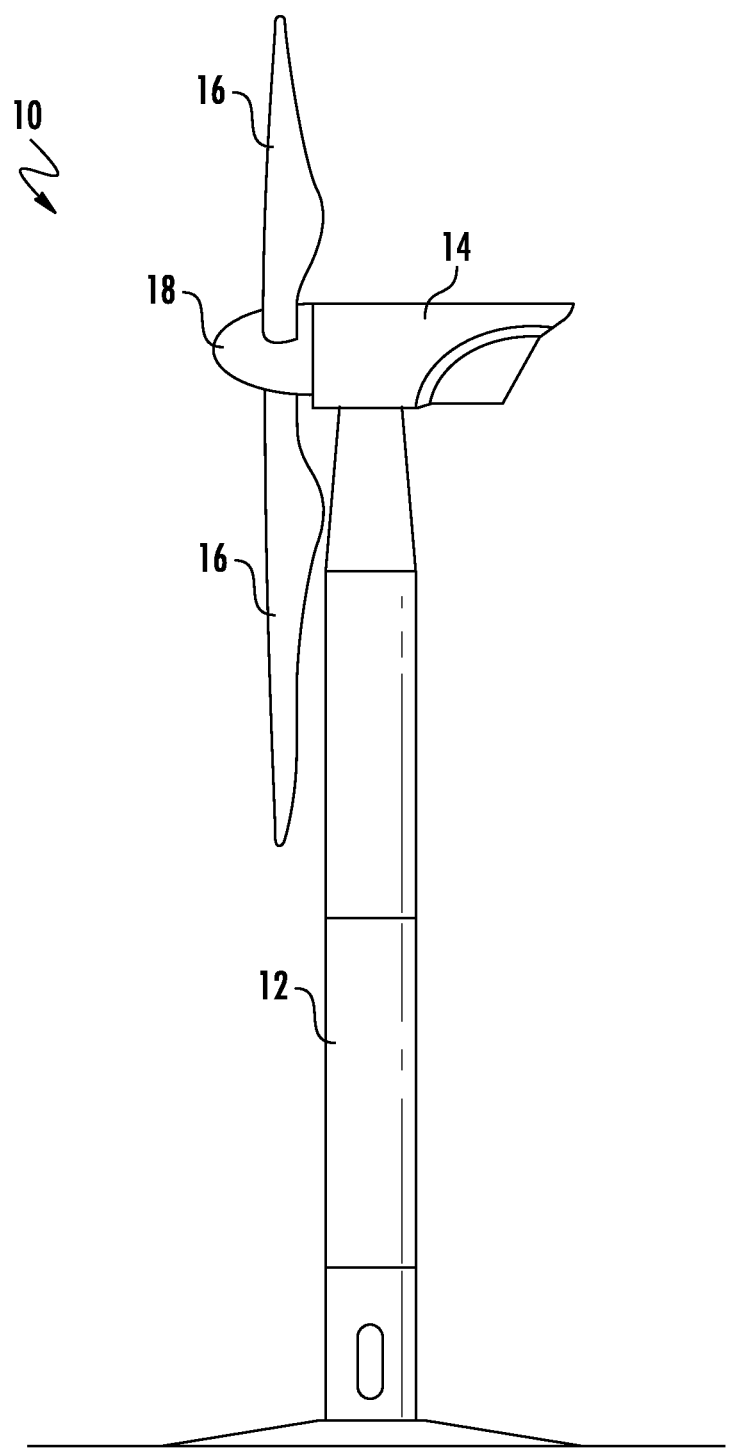
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a rotor blade assembly having an adhesive connection between the extreme trailing edge of the rotor blade and a fiber laminate connection immediately after. More particularly, the adhesive connection is made between both the pressure and suction sides of the rotor blade as well as to the fiber laminate connection at a fillet interface. Thus, the adhesive connection is configured to improve the effectiveness of the bond as it helps to form a fillet profile, which is the most robust profile in terms of crack propagation. The fiber laminate connection is made using a fiber laminate within a resin matrix, overlaid around a compressible core material, thus ensuring a strong bond and creating the preferential convex adhesive fillet profile as viewed from the trailing edge of the rotor blade.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft (not shown). The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbines, but may be utilized in any application having rotor blades. Further, the methods described herein may also apply to manufacturing any similar structure that benefits from printing a structure directly to skins within a mold before the skins have cooled so as to take advantage of the heat from the skins to provide adequate bonding between the printed structure and the skins. As such, the need for additional adhesive or additional curing is eliminated.

Figure 2:
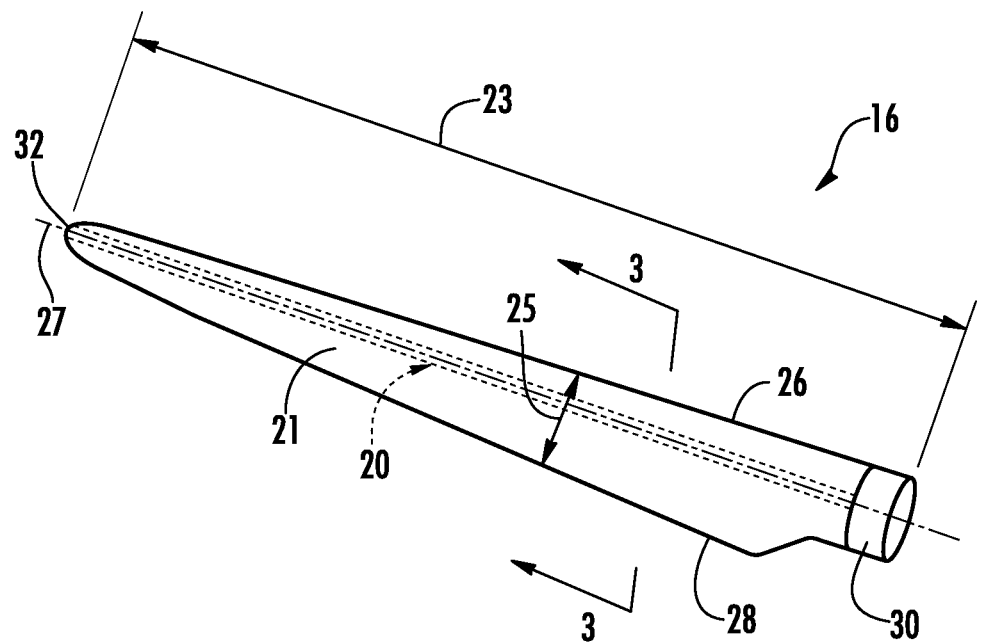
FIG. 2 illustrates a perspective view of one of the rotor blades of FIG. 1.
Figure 3:
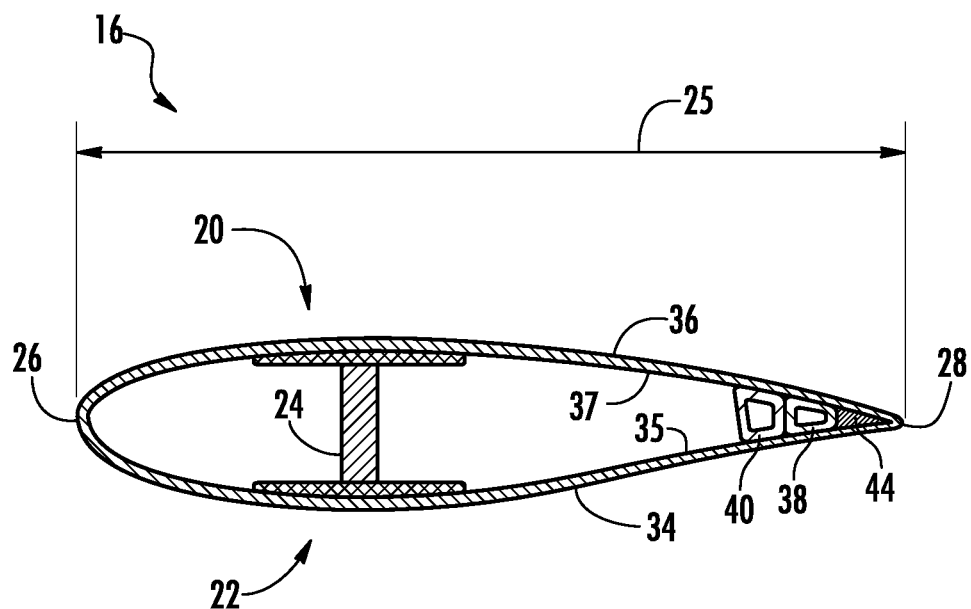
FIG. 3 illustrates a cross-sectional view of the rotor blade assembly of FIG. 2 along line 3-3.
Figure 4:
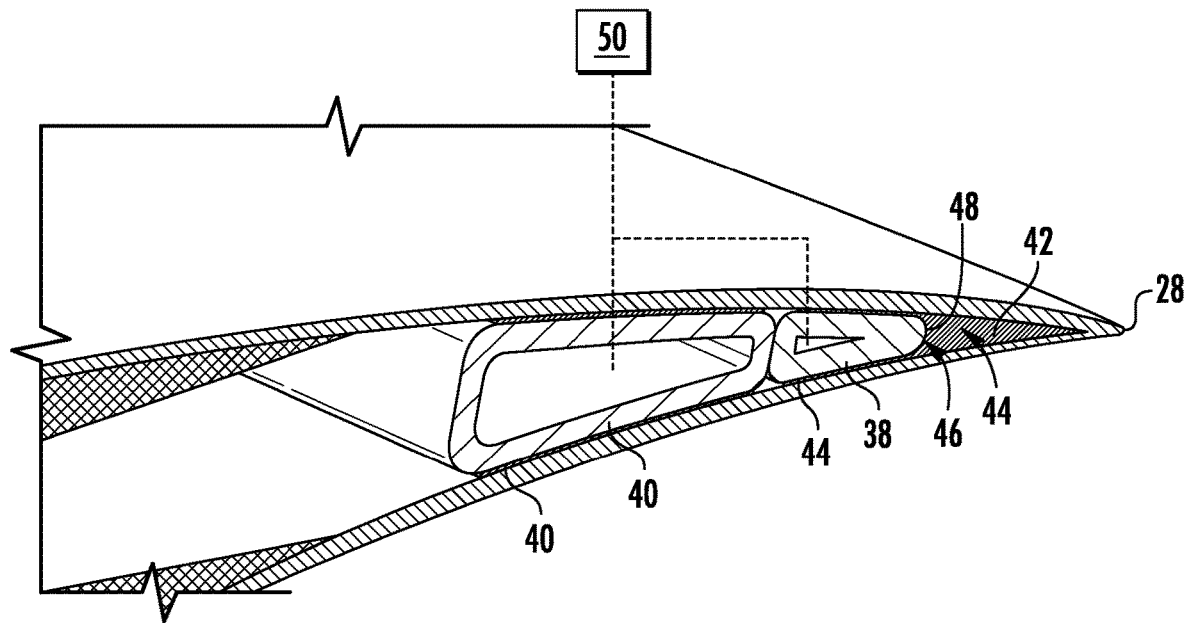
FIG. 4 illustrates a detailed, cross-sectional view of the rotor blade assembly of FIG. 3 at the trailing edge thereof.
Figure 5:
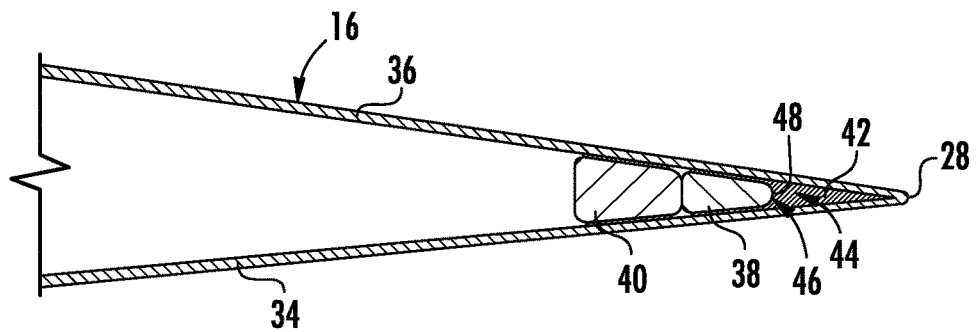
FIG. 5 illustrates a detailed, cross-sectional view of another embodiment of a rotor blade assembly at the trailing edge thereof according to the present disclosure.

Referring now to FIGS. 3-5, various views of several embodiments of one of the rotor blades 16 of FIG. 1 (also referred to herein as rotor blade assembly) are illustrated in accordance with aspects of the present subject matter. In particular, FIG. 2 illustrates a perspective view of the rotor blade 16. FIG. 3 illustrates a cross-sectional view of the rotor blade 16 along the sectional line 3-3 shown in FIG. 2. FIG. 4 illustrates a detailed, cross-sectional view of the rotor blade 16 of FIG. 4. FIG. 5 illustrates a detailed, cross-sectional view of another embodiment of the rotor blade 16 according to the present disclosure.

In addition, as shown in the illustrated embodiments, the rotor blade 16 generally includes a blade root 30 configured to be mounted or otherwise secured to the hub 18 (FIG. 1) of the wind turbine 10 and a blade tip 32 disposed opposite the blade root 30. A body shell 21 of the rotor blade generally extends between the blade root 30 and the blade tip 32 along a longitudinal axis 27. The body shell 21 may generally serve as the outer casing/covering of the rotor blade 16 and may define a substantially aerodynamic profile, such as by defining a symmetrical or cambered airfoilshaped cross-section. The body shell 21 may also define a pressure side 34 and a suction side 36 extending between leading and trailing edges 26, 28 of the rotor blade 16. Further, the rotor blade 16 may also have a span 23 defining the total length between the blade root 30 and the blade tip 32 and a chord 25 defining the total length between the leading edge 26 and the trialing edge 28. As is generally understood, the chord 25 may vary in length with respect to the span 23 as the rotor blade 16 extends from the blade root 30 to the blade tip 32.

In several embodiments, the body shell 21 of the rotor blade 16 may be formed as a single, unitary component. Alternatively, the body shell 21 may be formed from a plurality of shell components. For example, the body shell 21 may be manufactured from a first shell half generally defining the pressure side 34 of the rotor blade 16 and a second shell half generally defining the suction side 36 of the rotor blade 16, with such shell halves being secured to one another at the leading and trailing ends 26, 28 of the blade 16.

Additionally, the body shell 21 may generally be formed from any suitable material. For instance, in one embodiment, the body shell 21 may be formed entirely from a laminate composite material, such as a carbon fiber reinforced laminate composite or a glass fiber reinforced laminate composite. Alternatively, one or more portions of the body shell 21 may be configured as a layered construction and may include a core material, formed from a lightweight material such as wood (e.g., balsa), foam (e.g., extruded polystyrene foam) or a combination of such materials, disposed between layers of laminate composite material. In addition, the body shell 21 may be constructed, at least in part, from a thermoset and/or a thermoplastic material.

The thermoplastic materials described herein generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Further, the thermoset materials described herein generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

In addition, as mentioned, the thermoplastic and/or the thermoset material described herein may optionally be reinforced with a fiber material, including but not limited to glass fibers, carbon fibers, polymer fibers, wood fibers, bamboo fibers, ceramic fibers, nanofibers, metal fibers, or similar or combinations thereof. In addition, the direction of the fibers may include multi-axial, unidirectional, biaxial, triaxial, or any other another suitable direction and/or combinations thereof. Further, the fiber content may vary depending on the desired stiffness, and/or the location within the rotor blade 16.

Referring particularly to FIG. 3, the rotor blade 16 may also include one or more longitudinally extending structural components configured to provide increased stiffness, buckling resistance, and/or strength to the rotor blade 16. For example, the rotor blade 16 may include one or more longitudinally extending spar caps 20, 22 configured to be engaged against the opposing inner surfaces 35, 37 of the pressure and suction sides 34, 36 of the rotor blade 16, respectively. Additionally, one or more shear webs 24 may be disposed between the spar caps 20, 22 so as to form a beam-like configuration. The spar caps 20, 22 may generally be designed to control the bending stresses and/or other loads acting on the rotor blade 16 in a generally span-wise direction (a direction parallel to the span 23 of the rotor blade 16) during operation of a wind turbine 10. Similarly, the spar caps 20, 22 may also be designed to withstand the span-wise compression occurring during operation of the wind turbine 10.

The spar caps 20, 22 and/or the shear web(s) 24 described herein may also be formed of one or more thermoset and/or thermoplastic materials as well as one or more pultrusions. As used herein, "pultrusions" or similar generally encompass reinforced materials (e.g. fibers or woven or braided strands) that are impregnated with a resin and pulled through a stationary die such that the resin cures or undergoes polymerization. As such, the process of manufacturing pultruded members is typically characterized by a continuous process of composite materials that produces composite parts having a constant cross-section. Thus, the pre-cured composite materials may include pultrusions constructed of reinforced thermoset or thermoplastic materials. Further, the spar caps 20, 22, may be formed of the same pre-cured composites or different pre-cured composites. In addition, the pultruded components may be produced from rovings, which generally encompass long and narrow bundles of fibers that are not combined until joined by a cured resin.

Referring particularly to FIGS. 3-5, the rotor blade assembly 16 further includes at least one structural feature 38, 40 secured within the rotor blade 16 at the trailing edge 28. For example, as shown in the illustrated embodiments, the rotor blade assembly 16 may include a plurality of structural features 38, 40 arranged in an end-to-end configuration (i.e. abutting against each other) in a chord-wise direction. More specifically, as shown, the rotor blade assembly 16 includes two structural features, namely, a first structural feature 38 closest to the trailing edge 28 and a second structural feature 40 closest to the leading edge 26. It should be understood that the rotor blade assembly 16 may further include any suitable number of structural features including less than two and more than two. In further embodiments, as shown, the structural feature(s) 38, 40 may be formed of a compressible material. As such, when the structural feature(s) 38, 40 are compressed between the pressure and section sides 34, 36 of the rotor blade, the structural feature(s) 38, 40 have a tapered chord-wise cross-section that contacts the inner surfaces 35, 37 of the pressure and suction sides 34, 36. In addition, as shown particularly in FIGS. 3 and 4, the structural feature(s) 38, 40 may have a hollow cross-section. In such embodiments, the rotor blade assembly may also include a pressurized air source 50 configured to pressurize the structural feature(s) 38, 40 between the pressure and suction sides 34, 36. In one embodiment, for example, the pressurized air source 50 may be configured to provide pressurized air within the hollow cross-section. Alternatively, as shown in FIG. 5, the structural feature(s) 38, 40 may have a solid cross-section.

In additional embodiments, the structural feature(s) 38, 40 may be constructed, at least in part, of a thermoset material or a thermoplastic material, such as the thermoset and/or thermoplastic materials described herein. In such embodiments, the thermoplastic and/or the thermoset material as described herein may optionally be reinforced with one or more fiber materials, including but not limited to glass fibers, carbon fibers, polymer fibers, wood fibers, bamboo fibers, ceramic fibers, nanofibers, metal fibers, or similar or combinations thereof. In addition, the direction of the fibers may include multi-axial, unidirectional, biaxial, triaxial, or any other another suitable direction and/or combinations thereof. Further, the fiber content may vary depending on the desired stiffness. More specifically, in particular embodiments, the structural feature(s) 38, 40 may be constructed of a compressible core material that is partially surrounded by a thermoset material and/or a thermoplastic material.

Further, as shown in FIGS. 3-5, the structural feature(s) 38, 40 are also spaced apart from the trailing edge 28 by a predetermined chord-wise distance to define a minimal void 42 between the pressure side 34, the suction side 36, and the trailing edge 28. Thus, as shown, the rotor blade assembly 16 also includes an adhesive 44 that fills (usually completely) the void 42 so as to provide an adhesive connection between the pressure side 34, the suction side 36, the trailing edge 28, and the structural feature(s) 38, 40. In addition, as shown, the adhesive 44 contacts at least one of the structural feature(s) 38, 40 at an interface 46 that defines a fillet or curved profile. More specifically, as shown, the fillet profile 46 defines a convex curve 48 that faces the trailing edge 28 of the rotor blade 16. Thus, the adhesive quantity can be controlled in terms of parasitic mass squeeze out via the compressible material which acts as a barrier for excess adhesive that leaks into the blade cavity. In additional embodiments, the adhesive 44 can also be configured to secure the structural feature(s) within the rotor blade 16 and to the inner surfaces 35, 37 of the pressure and suction sides 34, 36, respectively.

Figure 6:
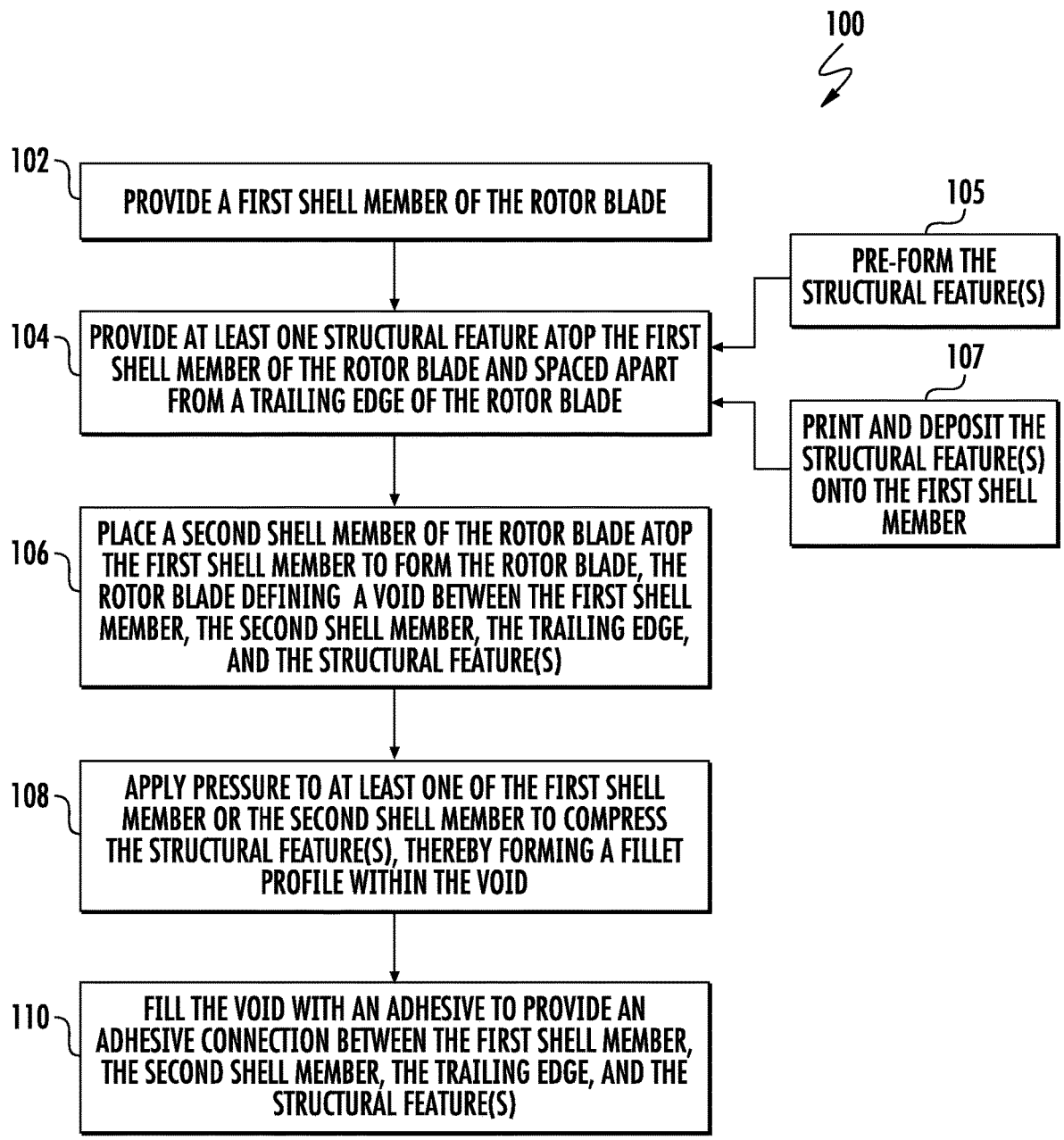
FIG. 6 illustrates a flow diagram of one embodiment of a method for joining shell members of a rotor blade together according to the present disclosure.

Referring now to FIG. 6, a flow diagram of one embodiment of a method 100 joining shell members of a rotor blade together is illustrated. In general, the method 100 will be described herein with reference to the rotor blade 16 described above with reference to FIGS. 1-5. However, it should be appreciated by those of ordinary skill in the art that the disclosed method 100 may generally be utilized to manufacture any other rotor blade having any suitable configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at 102, the method 100 includes providing a first shell member of the rotor blade 16. In certain embodiments, the shell members described herein (which form the pressure and/or suction side surfaces 34, 36) may include one or more continuous, multi-axial (e.g. biaxial) fiber-reinforced thermoplastic or thermoset outer skins. Further, in particular embodiments, the shell members may be formed using injection molding, 3-D printing, 2-D pultrusion, 3-D pultrusion, thermoforming, vacuum forming, pressure forming, bladder forming, automated fiber deposition, automated fiber tape deposition, and/or vacuum infusion.

As shown at 104, the method 100 includes providing at least one structural feature 38, 40 atop the first shell member of the rotor blade 16 and spaced apart from the trailing edge 28 of the rotor blade 16. For example, as shown at 105, the method 100 may include pre-forming the structural feature (s) 38, 40 and securing the structural feature(s) 38, 40 to the first shell member. Alternatively, as shown at 107, the method 100 may include printing and depositing, e.g. via a computer numeric control (CNC) device, the structural feature(s) 38, 40 onto the first or second shell members of the rotor blade 16. As used herein, 3-D printing is generally understood to encompass processes used to synthesize three-dimensional objects in which successive layers of material are formed under computer control to create the objects. As such, objects of almost any size and/or shape can be produced from digital model data. It should further be understood that the methods of the present disclosure are not limited to 3-D printing, but rather, may also encompass more than three degrees of freedom such that the printing techniques are not limited to printing stacked two-dimensional layers, but are also capable of printing curved shapes.

Still referring to FIG. 6, as shown at 106, the method 100 includes placing a second shell member of the rotor blade 16 atop the first shell member to form the rotor blade 16. Thus, as mentioned, the rotor blade 16 defines a void 42 between the first shell member, the second shell member, the trailing edge 28, and at least one of the structural feature(s) 38, 40. As shown at 108, the method 100 includes applying pressure to either or both of the first or second shell members to compress the structural feature(s) 38, 40, thereby forming a fillet profile 48 within the void 42. In one embodiment, the step of applying pressure to either or both of the first or second shell members to compress the structural feature(s) 38, 40 causes a tapered chord-wise cross-section of the structural feature(s) 38, 40 to contact the inner surfaces 35, 37 of the first and/or second shell members of the rotor blade 16.

As shown at 110, the method 100 includes filling the void 42 with an adhesive 44 to provide an adhesive connection between the first shell member, the second shell member, the trailing edge 28, and the structural feature(s) 38, 40. More specifically, in one embodiment, the convex curve 48 within the void 42 may be filled with the adhesive 44. In additional embodiments, the method 100 may further include providing the adhesive 44 between the inner surfaces 35, 37 of the first and second shell members of the rotor blade 16 and the structural feature(s) 38, 40 to secure the structural feature(s) 38, 40 within the rotor blade 16.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for joining shell members of a rotor blade together, the method comprising:
   providing a first shell member of the rotor blade;
   providing at least one structural feature atop the first shell member of the rotor blade and spaced apart from a trailing edge of the rotor blade, wherein the at least one structural feature has a tapered chord-wise cross-section continuously decreasing towards the trailing edge of the rotor blade;
   placing a second shell member of the rotor blade atop the first shell member to form the rotor blade, the rotor blade defining a void between the first shell member, the second shell member, the trailing edge, and the at least one structural feature;
   applying pressure to at least one of the first shell member or the second shell member to compress the at least one structural feature, thereby forming a fillet profile within the void; and,
   filling the void with an adhesive to provide an adhesive connection between the first shell member, the second shell member, the trailing edge, and the at least one structural feature.

2. The method of claim 1, wherein the fillet profile defines a convex curve that faces the trailing edge of the rotor blade, wherein filling the void with the adhesive to provide the adhesive connection between the first shell member, the second shell member, the trailing edge, and the at least one structural feature further comprises filling the convex curve with the adhesive.

3. The method of claim 1, wherein providing the at least one structural feature atop the first shell member of the rotor blade and spaced apart from the trailing edge of the rotor blade further comprises at least one of pre-forming the at least one structural feature and securing the at least one structural feature to the first shell member or printing and depositing, via a computer numeric control (CNC) device, the at least one structural feature onto the first shell member of the rotor blade.

4. The method of claim 1, wherein applying pressure to at least one of the first shell member or the second shell member to compress the at least one structural feature causes the tapered chord-wise cross-section of the at least one structural feature to contact the inner surfaces of the first and second shell members of the rotor blade.

5. The method of claim 4, further comprising providing the adhesive between the inner surfaces of the first and second shell members of the rotor blade and the at least one structural feature to secure the at least one structural feature within the rotor blade.

6. The method of claim 1, further comprising forming the at least one structural feature, at least in part, of at least one of a thermoset material or a thermoplastic material and reinforcing the thermoset material and/or the thermoplastic material with one or more fiber materials.

7. The method of claim 6, wherein forming the at least one structural feature, at least in part, of at least one of the thermoset material or the thermoplastic material further comprises at least partially surrounding a core material with at least one of the thermoset material or the thermoplastic material.

8. The method of claim 1, wherein the at least one structural feature comprises a plurality of structural features, such that the step of providing the at least one structural feature atop the first shell member of the rotor blade and spaced apart from the trailing edge of the rotor blade further comprises arranging the plurality of structural features in an end-to-end configuration in a chord-wise direction.

9. The method of claim 1, wherein the at least one structural feature comprises a first structural feature having a first tapered cross-section in the chord-wise direction and a second structural feature having a second tapered cross-section in the chord-wise direction.

10. The method of claim 7, wherein the core material is compressible.

11. The method of claim 1, wherein the at least one structural feature is compressible.

12. The method of claim 1, wherein the at least one structural feature is hollow.

13. A method for joining shell members of a rotor blade together, the method comprising:
   providing a first shell member of the rotor blade;
   providing at least one structural feature atop the first shell member of the rotor blade and spaced apart from a trailing edge of the rotor blade, wherein the at least one structural feature is formed, at least in part, of at least one of a thermoset material and a thermoplastic material, the at least one of the thermoset material and the thermoplastic material being reinforced with one or more fiber materials, the at least one structural feature further comprising a core material at least partially surrounded by the at least one of the thermoset material and the thermoplastic material, wherein the at least one structural feature has a tapered chord-wise cross-section continuously decreasing towards the trailing edge of the rotor blade;
   placing a second shell member of the rotor blade atop the first shell member to form the rotor blade, the rotor blade defining a void between the first shell member, the second shell member, the trailing edge, and the at least one structural feature;
   applying pressure to at least one of the first shell member or the second shell member to compress the at least one structural feature, thereby forming a fillet profile within the void; and,
   filling the void with an adhesive to provide an adhesive connection between the first shell member, the second shell member, the trailing edge, and the at least one structural feature.

14. The method of claim 13, wherein the at least one structural feature is compressible.

15. The method of claim 13, wherein the at least one structural feature is hollow.

16. A method for joining shell members of a rotor blade together, the method comprising:
   providing a first shell member of the rotor blade;
   providing a plurality of structural features atop the first shell member of the rotor blade and spaced apart from a trailing edge of the rotor blade, wherein the plurality of structural features are arranged end-to-end in a chord-wise direction with respect to one another, wherein each of the structural features has a tapered chord-wise cross-section continuously decreasing towards the trailing edge of the rotor blade;
   placing a second shell member of the rotor blade atop the first shell member to form the rotor blade, the rotor blade defining a void between the first shell member, the second shell member, the trailing edge, and the plurality of structural features;

applying pressure to at least one of the first shell member or the second shell member to compress the plurality of structural features, thereby forming a fillet profile within the void; and, filling the void with an adhesive to provide an adhesive connection between the first shell member, the second shell member, the trailing edge, and the plurality of structural features.

17. The method of claim 16, wherein each of the structural features is compressible.

18. The method of claim 16, wherein each of the structural features is hollow.

\* \* \* \* \*